(No Model.)
E. NORTON.
DEVICE FOR SEAMING THE HEADS UPON CANS.
No. 487,764. Patented Dec. 13, 1892.
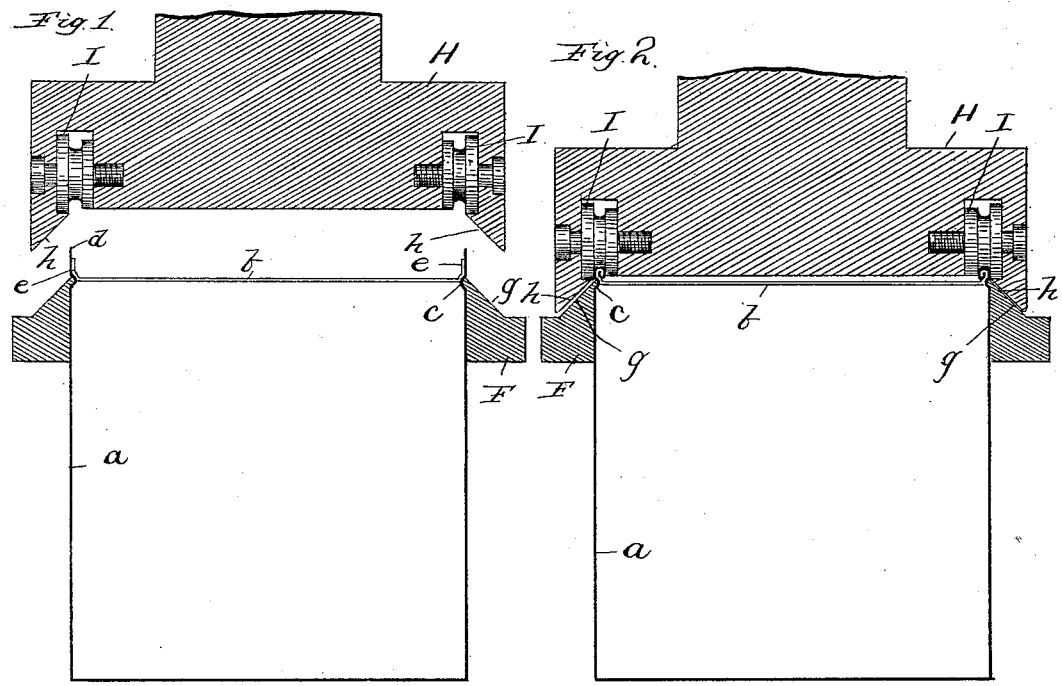
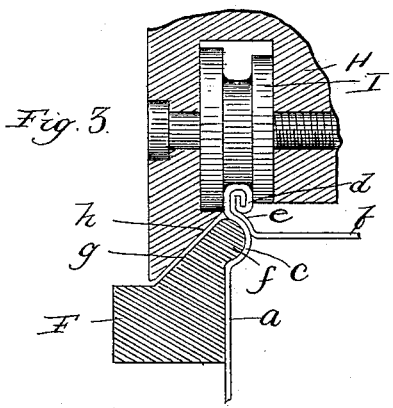
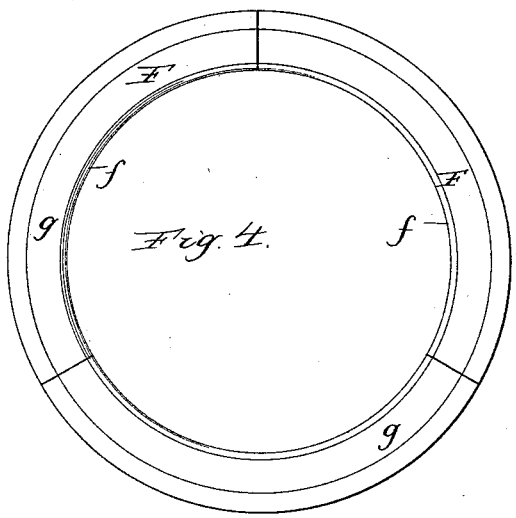
Witnesses:
Lew. E. Curtis
H. W. Munday
Inventor:
Edwin Norton
By Munday Evarts & Adcock
His Attorneys.

UNITED STATES PATENT OFFICE.

EDWIN NORTON, OF MAYWOOD, ILLINOIS, ASSIGNOR TO HIMSELF AND OLIVER W. NORTON, OF SAME PLACE.

DEVICE FOR SEAMING THE HEADS UPON CANS.

SPECIFICATION forming part of Letters Patent No. 487,764, dated December 13, 1892.

Application filed November 20, 1891. Serial No. 412,482. (No model.)

*To all whom it may concern:*

Be it known that I, EDWIN NORTON, a citizen of the United States, residing at Maywood, in the county of Cook and State of Illinois, have invented a new and useful Improvement in Devices for Seaming the Heads upon Cans, of which the following is a specification.

This invention relates to mechanism employed for forming the seam between the bodies and heads of that class of cans shown in Letters Patent No. 174,821, dated March 14, 1876, to W. S. Johnson, and in Letters Patent No. 338,767, granted to me and dated March 30, 1886. The can shown in said patents is provided with an inwardly-projecting bead upon which the head rests and which serves to resist the end thrust or pressure exercised by the seaming-tool in completing the seam, this inward bead being closed together in the final operation upon the seam or previously.

The object of my invention is to provide means for seaming the head to the body of such cans by rolling the seam inward, so that the seam will lie adjacent to and upon the head and wholly within the circumference of the can-body without causing the walls of the inwardly-projecting bead on the can-body to close together and thereby prevent all danger of cracking the stock and thus causing leaks.

The nature of my improvement is fully disclosed in the following description and the accompanying drawings, wherein—

Figure 1 is a vertical section of my improved seaming devices, showing a can in position ready to be seamed and showing the seaming-rollers and their shaft or bearing in elevation. Fig. 2 is a like view showing the devices in operation. Fig. 3 is an enlarged section showing the completed seam with one of the seaming-rollers in position thereon. Fig. 4 is a plan of the sectional chuck employed for supporting the can-body during the operation.

In the drawings, $a$ represents the can-body, and $b$ the can-head. The former is provided with an inwardly-extending bead $c$, forming an external annular groove substantially semicircular in cross-section, and above this bead is the part $d$, which is bent over in the seaming. The head is provided with an upwardly-standing flange $e$.

To bend the edge $d$ inwardly and downwardly and over the flange $e$ is the seaming operation to be performed by my improved mechanism, the form of the seam being clearly illustrated at Fig. 3. The can-body is placed preparatory to the operation in a sectional chuck adapted to open and close and to fit the exterior of the cam snugly and support the same. This chuck is made in any suitable number of sections F, and the sections are each provided with an inwardly-extending flange $f$, corresponding and fitting into the groove formed by inward bead $c$ of the can-body. The flanges of the chuck-sections extend inwardly far enough so that they will receive and sustain the downward thrust of the seaming-rollers and prevent the closing of the bead, the object of this feature being to obviate the necessity existing in the said patented cans for closing the bead to obtain means of support for the said downward thrust. The outside of the sections F is beveled off, as shown at $g$, so as to give room to the downwardly-projecting flange or rim $h$ of the rotating seaming-head H. In this seaming-head are located a number of freely-revolving grooved rollers I, which, as the head is rotated, come in contact with the edge $d$ and the flange $e$ and turn them over into completed seam shown at Fig. 3. In this operation that portion of the can-body edge standing above the flange $e$ is first turned down over the latter, and then the united parts $d$ and $e$ are doubled upon themselves to complete the joint. The head H is adapted to be lowered into operative position in the usual manner or the can may be raised to a position where it will be operated upon. Upon the completion of the seam the chuck is opened and the can is discharged and another one inserted. The seaming-rollers are of less diameter at the inside of the groove than at the outside by preference to prevent any possibility of the seaming-tool bearing upon any portion of the head, except such as is to be folded into the seam. The greater diameter of the outer side of the roller serves to confine the metal and to guide it in the proper direction. The sectional chuck should be provided with means whereby it may be opened and closed; but as such means may be variously constructed I have not deemed it necessary to illustrate them.

It will be seen that the sharp bend heretofore made by the closing of the bead is avoided by the use of my improved chuck, as the flange of the mandrel retains the form of the bead unaffected by the pressure caused by the seaming, thus economizing the metal used in the body of the can and avoiding the danger of creating leaks and breaking the tin coating. I am also enabled to use stock of a grade inferior to that heretofore used without danger to the integrity of the can, and to avoid all necessity of applying solder to cover cracks in the stock.

I claim—

1. The device for seaming heads upon cans, having an external groove and an internal bead near the top edge of the can to form a shoulder or support for the head or cover of the can to rest upon within the circumferential line of the can-body, consisting in the combination, with a revolving seaming-head furnished with one or more seaming-rollers, of a sectional chuck adapted to surround the can-body and provided with a flange fitting in the external groove of the can to support the bead and prevent its closing or yielding during the seaming operation, said seaming-head operating to turn or roll the seam inwardly down upon the can-head and within the circumferential line of the can-body, so that the seam will not project outside the periphery of the can-body, substantially as specified.

2. The combination, in a device for seaming the ends or covers upon cans, having an external groove and an internal bead to support the cover within the circumferential line of the can-body, of a sectional chuck surrounding the can and provided with an interior flange fitting in the external groove of the can, and a seaming-head coacting therewith to seam the can to the cover while the walls of the bead are thus supported by the chuck and prevented from collapsing, said seaming-head operating to turn or roll the seam inwardly down upon the can-head and within the circumferential line of the can-body, so that the seam will not project outside the periphery of the can-body, substantially as specified.

3. The combination, with an interior-flanged chuck adapted to surround the can-body and fit in the external groove thereon, of a seaming-head coacting therewith to seam the head to the body of the can, said chuck and seaming-head having coacting bevel rims or flanges $g\ h$, substantially as specified.

4. The improvement in the art of seaming the final heads or covers upon filled cans, having an external annular groove and an internal bead to form a ledge or support for the cover to rest upon within the circumferential line of the can-body, consisting in supporting the walls of said bead from the outside and simultaneously seaming the cover to the can-body by folding or rolling the top edge of the can-body projecting above the bead inwardly over the upwardly-projecting flange of the can-head and thus forming the seam on top of the can-head and within the circumferential line of the can-body, substantially as specified.

EDWIN NORTON.

Witnesses:
H. M. MUNDAY,
EMMA HACK.